United States Patent [19]
Robert

[11] Patent Number: 5,902,152
[45] Date of Patent: May 11, 1999

[54] ACTIVE CONNECTOR FOR A CHIP CARD

[75] Inventor: Bernard Robert, Pontarlier, France

[73] Assignee: Framatome Connectors International, Courbevoie, France

[21] Appl. No.: 08/772,151

[22] Filed: Dec. 20, 1996

[30] Foreign Application Priority Data

Dec. 28, 1995 [FR] France ................... 95/15666

[51] Int. Cl.$^6$ ................................. G06K 7/06
[52] U.S. Cl. ........................... 439/620; 439/69
[58] Field of Search ................. 439/66, 69, 71, 439/620; 235/441, 479, 486

[56] References Cited

U.S. PATENT DOCUMENTS

| | | | |
|---|---|---|---|
| 4,089,575 | 5/1978 | Grabbe | 437/71 |
| 4,447,716 | 5/1984 | Aigo | 235/441 |
| 4,871,316 | 10/1989 | Herrell | 439/66 |
| 4,993,956 | 2/1991 | Pickles et al. | 439/76 |
| 5,226,826 | 7/1993 | Nillson et al. | 439/72 |
| 5,258,411 | 11/1993 | Sherman | 361/720 |
| 5,309,324 | 5/1994 | Herandez | 439/66 |
| 5,378,160 | 1/1995 | Yumibe et al. | 439/66 |

FOREIGN PATENT DOCUMENTS

| | | |
|---|---|---|
| 0 515 153 | 11/1992 | European Pat. Off. . |
| 2 587 549 | 3/1987 | France . |
| 95 01 271 | 2/1995 | France . |
| WO 95/33245 | 12/1995 | WIPO . |

Primary Examiner—Neil Abrams
Attorney, Agent, or Firm—Perman & Green, LLP

[57] ABSTRACT

The active connector for a chip card is made up of a component (1) for control of the reading-writing operations of the chip card (20) and a reading frame for the chip card comprising a support component (2) made of insulating material and receiving contact terminals of a first type (3) projecting from an upper plane (4) of the support made of insulating material in order to be in electrical contact with contact areas (5) of the chip card. The insulating support comprises a lower face (6) inscribing in a lower plane, from which, on the one hand, contact terminals of a second type (7) project so as to be in electrical contact with contact areas (8) of the component for control of the reading-writing operations of the chip card and, on the other hand, connection leg pieces (9) for connection onto a printed circuit, leg height (h) defining a space between the insulating support and printed circuit (15) such that the control component is housed between the lower plane of the insulating support and the printed circuit.

10 Claims, 2 Drawing Sheets

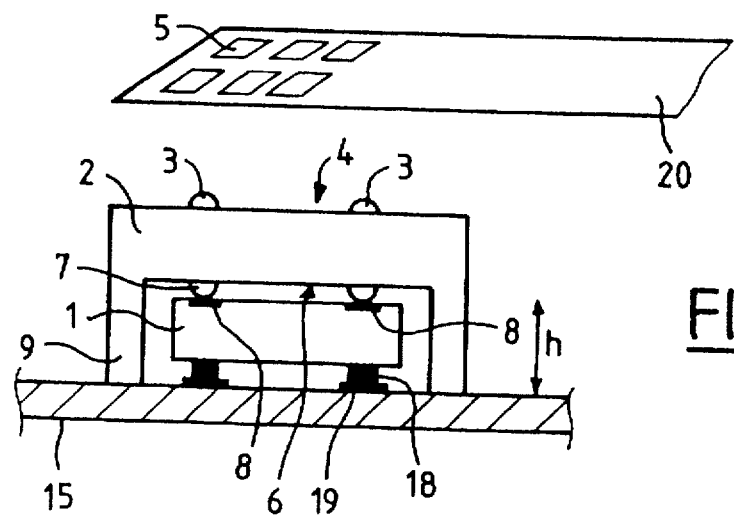
FIG_1
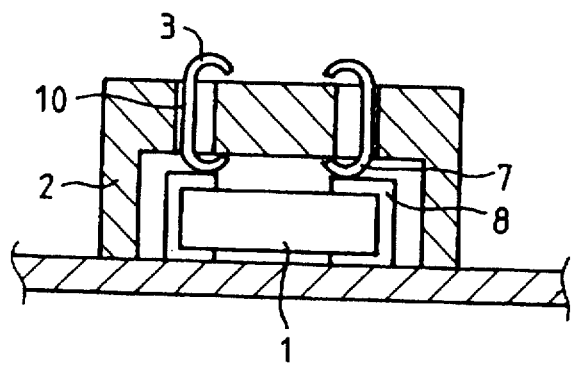
FIG_2
FIG_3
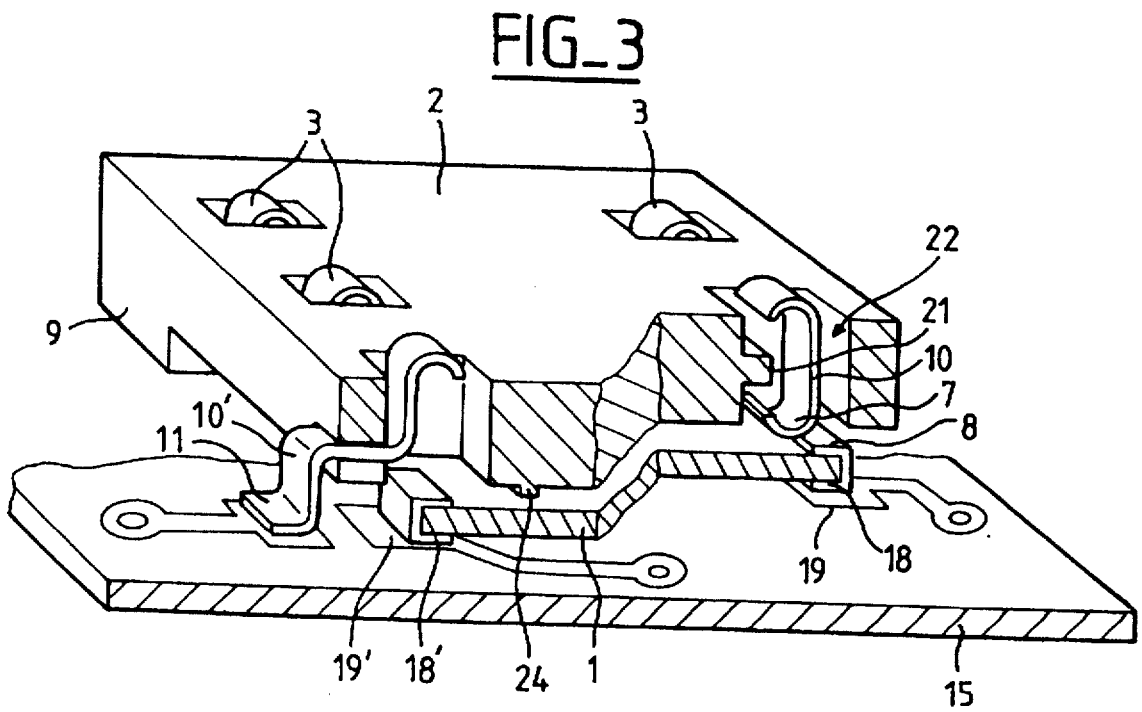

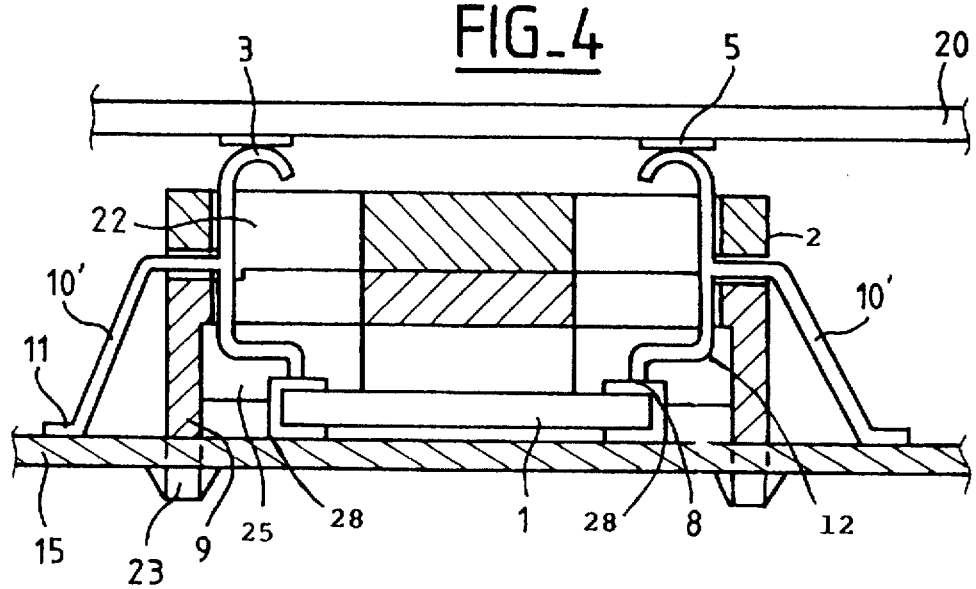
FIG_4
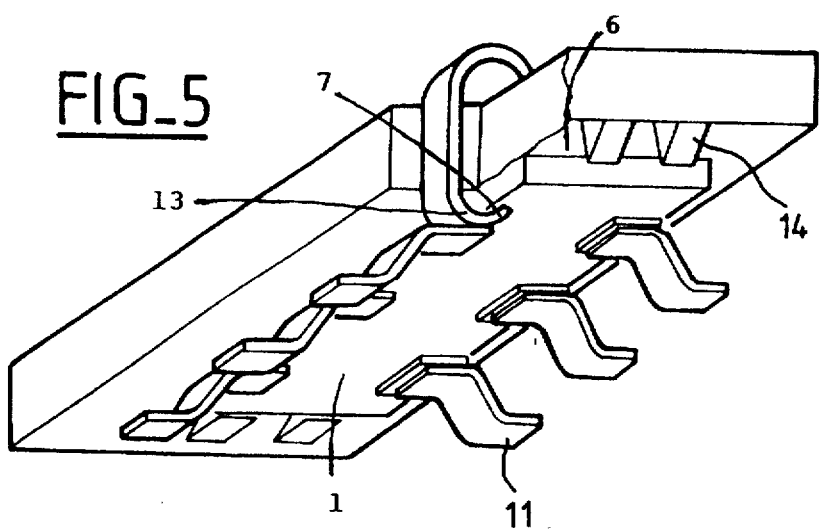
FIG_5
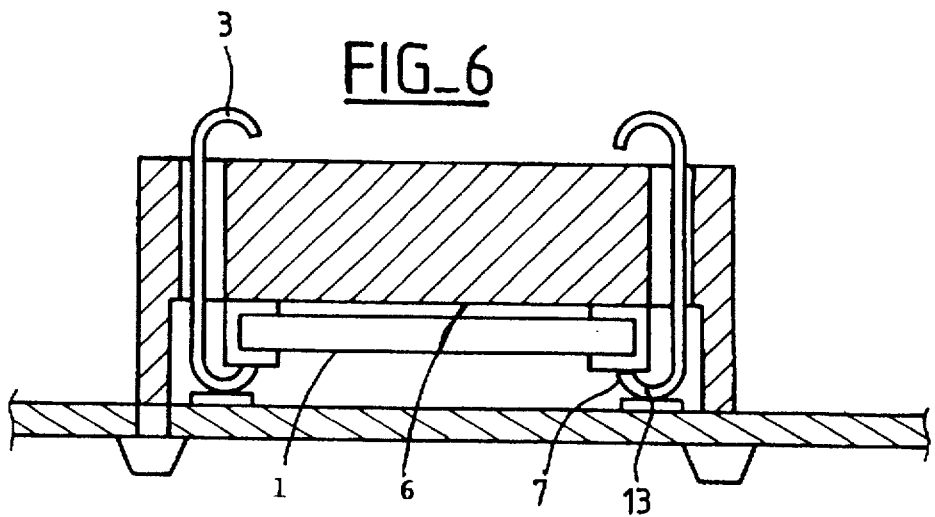
FIG_6

ACTIVE CONNECTOR FOR A CHIP CARD

BACKGROUND OF THE INVENTION

1. Field of the Invention

The invention concerns an active connector for a microcircuit card (or chip card), i.e., a connector for a chip card having a component for control of reading/writing operations of the card combined with a reading frame having a support and contact terminals with the chip card.

Reading frames for a chip card of the known type comprise contact terminals commonly called brush contacts designed to connect the contact areas of the card, for example, a memory card used in banking, public telephone, cellular telephone, and other applications, to an electronic device for processing the data contained in the chip.

In known systems, the application designer using chip cards must provide, on the one hand, electronic circuits for its application, as well as direct management devices for reading/writing the card, as a result of which there are increased constraints with regard to the size of this apparatus and there are additional costs relative to development time, testing and components used. Moreover, this design risks increasing connection lengths, which is unfavorable in terms of high frequency and susceptibility to electromagnetic disruptions and in terms of intrinsic radiation.

The increasing complexity of reading/writing management protocols of the card and the necessity of increasing the security of operations effected with the card, moreover, induce integrated-circuit manufacturers to produce components releasing the designer of electronic applications using chip cards from the management of reading/writing sequences or protocols of data on the card.

In patent application FR 95 01 271, the applicant describes the production of a connector for a chip card incorporating a control component whose input-output areas are interposed between certain connection terminals with the printed circuit of the electronic application and certain of the brush contacts by means of a connection network.

SUMMARY OF THE INVENTION

The present invention has for an objective to propose a new design for an active connector for plugged-in integration having the advantage of minimizing the lengths of electrical connections that are unfavorable for rapid signals.

For this purpose, the invention proposes to directly integrate a control component under a reading frame and provides for this a connector for a chip card that is principally comprised of a reading/writing operation-control component of the chip card and a reading frame for the chip card, the reading frame having a support made of insulating material and receiving contact terminals of a first type projecting from an upper support plane made of insulating material in order to be in electrical contact with the contact areas of the card; the insulating support also has a lower plane, from which projects, on the one hand, contact terminals of a second type in order to be in electrical contact with the contact areas of the control component for reading/writing operations of the card and, on the other hand, leg pieces for connection onto a printed circuit, with a leg height h defining the space between the insulating support and the printed circuit such that the control component is housed between the lower plane of the insulating support and the printed circuit.

According to other characteristics and modes of embodiment of the invention:

one or more contact terminals of the first type are extended by branch pieces connecting them to corresponding contact terminals of the second type to produce a direct connection between the contact areas of the chip card and the contact areas of the control component;

the connecting leg pieces are comprised of electrical connection tabs for one or more of the contact terminals of the first type with the printed circuit;

one or more connection tabs that may have a lateral branch piece for connecting with contact terminals of the second type;

the height of the connecting legs is such that the lateral branch pieces are placed under pressure on the respective contact areas of the control component, thus assuring both the electrical connection and the mechanical holding of the control component between the connector and the printed circuit;

one or more contact terminals of the second type having a spring part for hooking and holding a control component against the lower face of the insulating support, the spring part assuring that the second contact terminals are placed under pressure with the contact areas of the control component;

the insulating support has insertion guides for the control component beneath the insulating support;

the contact terminals of the first type and the contact terminals of the second type have end parts, respectively, upper and lower, generally shaped like a curve, of electrical contact strips emerging at either the upper or lower part of the insulating support, the outer surface of the upper end part being in elastic contact with a corresponding area of the chip card, the inner surface of the lower end part being in elastic contact with a corresponding area of the control component, and the outer surface of the lower end part being in contact with a corresponding track of the printed circuit.

BRIEF DESCRIPTION OF DRAWINGS

Other characteristics and advantages of the invention will appear upon reading the description that follows in reference to the attached drawings, which show:

in FIG. 1, a lateral view of an active connector according to the principle of the invention;

in FIGS. 2, 4, 6, lateral sectional views of an active connector according to several modes of embodiment of the invention;

in FIG. 3, a top perspective view, partially cutaway, of one variant of embodiment of the invention;

in FIG. 5, a bottom perspective view, partially cutaway, of one particular mode of embodiment of the invention.

DETAILED DESCRIPTION OF THE PREFERRED EMBODIMENTS

The principle of the connector according to the invention is diagrammed in FIG. 1. A reading frame is made up of support 2 and contact terminals of the first type or brush contacts 3 situated on upper surface 4 of the support 2, inscribing in a plane called the upper plane of the frame, and designed to produce an electrical connection with contact areas 5 of a chip card 20. The support comprises a lower surface 6, inscribing in a plane called the lower plane of the frame, raised relative to a printed circuit 15 and thus defining a housing for a control component 1, support 2 being connected with printed circuit 15 by connecting legs 9. The legs 9 have a height h defining a space between the insulating support and the printed circuit. Contacts 7 emerging from the lower surface of the support produce a direct connection between brush contact terminals 3 and contact areas 8 of component 1.

In FIG. 3, a first example of embodiment of an active connector is described in a cutaway view. Insulating support 2 comprises openings 22 from which emerge brush contacts 3. Brush contacts 3 are extended by branch pieces 10, 10' permitting either a direct connection by a connection tab 11 to a corresponding track of the printed circuit, in the case of uncontrolled electrical signals, or a connection to control component 1 by means of a contact 7 resting on a contact area 8 for signals needing to be conveyed by this component. According to the mode of embodiment of FIG. 3, the contact areas 8 of the control component 1 are generally U-shaped and thus provide an upper contact area 8 and a lower contact area 18 for connection to the track 19 printed on the circuit 15. This U-shape gives the advantage of simplifying the production of the control component 1 compared with a production for which the control component is provided with upper and lower areas such as described in FIG. 1. This configuration permits a possible reading of control signals at the level of the printed circuit. Control component 1 may comprise contact areas 18' not connected to brush contacts 3 and connected only to the printed circuit by tracks 19' so as to carry specific signals for the control component such as its supply or the signals designed for the application. In FIG. 3, one can see that branch pieces 10 are possibly mounted floating vertically in openings 22 and that these latter may comprise a vertical guide element 21. In this case, the contact element made up of brush contact 3, branch piece 10 and contact element 8 forms a spring contact whose forces are distributed between area 5 of the card and area 8 of the component 1. With regard to the brush contacts directly linked to the printed circuit by connection tabs 11, branch pieces 10' can exit laterally before intersecting the lower plane defined by the lower surface of the frame in order to be sufficiently spaced laterally from the connection areas of the control component 1. Branch pieces 10', moreover, may have a part molded into the frame to hold them. The support 2 may have, in addition to complementary leg pieces 9 supported on the printed circuit and possibly extended by a holding device 23 of the harpoon type (shown in FIG. 4), support and holding elements 24 for component 1.

In FIG. 4 a second example of embodiment is described for which brush contacts 3, extending above the upper plane of the frame, comprise part of a contact element with three branch pieces that has in its lower part at the lower plane of the frame, on the one hand, a connection branch 10' for connection to the printed circuit by a tab 11 and, on the other hand, a lateral branch 12 terminated by contact terminal 8. In this mode of embodiment, lateral branches 12 form the support spring for component 1 on the printed circuit 15, and the contact elements can either comprise a holding zone molded into insulating support 2, or be imprisoned in the insulating support, which, in this case, will comprise two parts. Advantageously, connection legs 9 are provided with a holding element 23 on the printed circuit 15, and the insulating support 2 has walls 25 for centering the support 2 relative to the component 1. The component 1 can be soldered onto the printed circuit 15 before mounting the reading frame, or the support/reading frame assembly can be mounted in one operation, openings 22 being of sufficient size so that visual inspection of the solders of areas 23 on the printed circuit 1 is possible.

In FIGS. 5 and 6 an alternative example of embodiment is described for which component 1 is held under the insulating support. Contact elements 7 then comprise either the terminal of a crossed spring contact that securely holds the component and produces the connection to the printed circuit by its outer surface 13, as shown in FIG. 6, or with an extension by a connection tab 11, as shown in FIG. 5. Guides 14, which are provided, for example, with an inclined plane to permit the insertion of the component and a free guide in the extraction direction of the component permit the insertion and holding in position of component 1.

In the Example of FIGS. 5 and 6, the signals are accessible at the level of the printed circuit by cross-pieces 13. In the example described in FIG. 4, the component 1 cannot comprise any contact area on its lower surface. Other versions for which one of the three branch pieces for certain contact elements can be omitted permit optimizing the connections and making accessible only the useful signals at the level of the printed circuit, and remain within the scope of the invention Soldering of the different connection tabs or areas onto the printed circuit can be conducted according to the usual techniques for flat placement of electronic components.

I claim:

1. Active connector for a chip card made up of a component (1) for control of the reading-writing operations of the chip card (20) and a reading frame for the chip card having a support (2) made of insulating material and receiving contact terminals of a first type (3) projecting from an upper plane (4) of the support in order to be in electrical contact with contact areas (5) of the chip card, characterized in that the insulating support has a lower surface (6) inscribing in a lower plane, from which projects, on the one hand, contact terminals of a second type (7) to be in electrical contact with contact areas (8) of the component for control of the reading-writing operations of the chip card and, on the other hand, leg pieces (9) for connection onto a printed circuit, leg height (h) defining a space between the insulating support and a printed circuit (15) such that the control component is lodged between the lower plane of the insulating support and the printed circuit, wherein the control component is sandwiched between the contact terminals of the second type (7) and the printed circuit (15) such that the control component is pressed against tracks (19) on the printed circuit (15).

2. Active connector for a chip card according to claim 1, further characterized in that one or more of the contact terminals of the first type (3) are extended by branch pieces (10) linking them to the corresponding contact terminals of the second type (7) to produce a direct connection between contact areas (5) of the chip card and the contact areas of the control component.

3. Active connector for a chip card according to claim 1, further characterized in that at least one of the branch pieces (10') terminates in an electrical connection tab (11) for connecting one or more of the contact terminals of the first type with the printed circuit (15).

4. Active connector for a chip card according to claim 3, further characterized in that one or more of the branch pieces has a lateral branch (12) for connecting with the contact terminals of the second type.

5. Active connector for a chip card according to claim 4, further characterized in that the height of the connection leg pieces is such that the lateral branches (12) are placed under pressure on respective ones of the contact areas (8) of the control component for both electrical connection and the mechanical holding of the control component between the connector and the printed circuit.

6. Active connector for a chip card according to claim 1, further characterized in that one or more of the contact terminals of the second type have a spring part (13) for anchoring and holding the control component against the lower surface (6) of the insulating support, the spring part assuring that the second contact terminals are pressed into place with the contact areas of the control component.

7. Active connector for a chip card according to claim 6, further characterized in that the contact terminals of the first type and the contact terminals of the second type are made up of end parts, respectively upper and lower, in a generally curved shape, the electrical contact strips emerging respectively at the upper part and the lower part of the insulating support, the outer surface of the upper end part being in elastic contact with a corresponding area of the chip card, the inner surface of the lower end part being in elastic contact with a corresponding area of the control component, and the outer surface of the lower end part being in contact with a corresponding track of the printed circuit.

8. Active connector for a chip card according to claim 6, further characterized in that the insulating support comprises insertion guides (14) for the control component beneath the insulating support.

9. Active connector for a chip card made up of a component (1) for control of the reading-writing operations of the chip card (20) and a reading frame for the chip card having a support (2) made of insulating material and receiving contact terminals of a first type (3) projecting from an upper plane (4) of the support in order to be in electrical contact with contact areas (5) of the chip card, characterized in that the insulating support has a lower surface (6) inscribing in a lower plane, from which projects, on the one hand, contact terminals of a second type (7) to be in electrical contact with contact areas (8) of the component for control of the reading-writing operating of the chip card and, on the other hand, leg pieces (9) for connection onto a printed circuit, leg height (h) defining a space between the insulating support and a printed circuit (15) such that the control component is lodged between the lower plane of the insulating support and the printed circuit, wherein at least one of the contact terminals of the second type have a spring part (13) for anchoring and holding the control component against the lower surface (6) of the insulating support, the spring part assuring that the second contact terminals are pressed into place with the contact areas of the control component.

10. Active connector for a chip card made up of a component (1) for control of the reading-writing operations of the chip card (20) and a reading frame for the chip card having a support (2) made of insulating material and receiving contact terminals of a first type (3) projecting from an upper plane (4) of the support in order to be in electrical contact with contact areas (5) of the chip card, characterized in that the insulating support has a lower surface (6) inscribing in a lower plane, from which projects, on the one hand, contact terminals of a second type (7) to be in electrical contact with contact areas (8) of the component for control of the reading-writing operating of the chip card and, on the other hand, leg pieces (9) for connection onto a printed circuit, leg height (h) defining a space between the insulating support and a printed circuit (15) such that the control component is lodged between the lower plane of the insulating support and the printed circuit, wherein the contact terminals of the second type (7) are in direct electrical contact with the contact areas (8) on a top side of the control component (1).

* * * * *